United States Patent
Cook et al.

[11] Patent Number: 5,347,391
[45] Date of Patent: Sep. 13, 1994

[54] ULTRA WIDE FIELD OF VIEW SCANNING SURVEILLANCE OPTICAL SYSTEM

[75] Inventors: Lacy G. Cook, El Segundo; Bryce A. Wheeler, Mammoth Lake, both of Calif.

[73] Assignee: Hughes Aircraft Company, Los Angeles, Calif.

[21] Appl. No.: 992,398

[22] Filed: Dec. 18, 1992

[51] Int. Cl.$^5$ ............... G02B 26/08; G02B 13/06
[52] U.S. Cl. ............... 359/211; 359/205; 359/354; 359/357; 359/663; 359/725; 359/749
[58] Field of Search ............... 359/211, 221, 725, 663, 359/205, 355, 357, 354, 749

[56] References Cited

U.S. PATENT DOCUMENTS

| | | | |
|---|---|---|---|
| 3,404,934 | 10/1968 | Brachvogel et al. | 359/725 |
| 3,619,027 | 11/1971 | Baker et al. | 359/211 |
| 3,762,793 | 10/1973 | Ullstig | 359/211 |
| 4,081,207 | 3/1978 | Dippel | 359/221 |
| 4,279,507 | 7/1981 | Bulpitt | 359/211 |
| 4,621,888 | 11/1986 | Crossland et al. | 359/357 |
| 4,768,184 | 8/1988 | Reno | 359/211 |

*Primary Examiner*—Loha Ben
*Assistant Examiner*—Evelyn A. Lester
*Attorney, Agent, or Firm*—Hugh P. Gortler; M. W. Sales; W. K. Denson-Low

[57] ABSTRACT

A refractive inverse telephoto optical system (10) has a first lens doublet (12), a Pechan prism assembly (14) and a second lens doublet (16). The Pechan prism assembly (14) is spaced between the front negative doublet (12) and the rear positive doublet (16). The Pechan prism assembly (14) may be rotated and, as rotation occurs, the associated linear detector array is rotated around within the optical field of view.

16 Claims, 1 Drawing Sheet

5,347,391

ULTRA WIDE FIELD OF VIEW SCANNING SURVEILLANCE OPTICAL SYSTEM

BACKGROUND OF THE INVENTION

1. Technical Field

The present invention relates to refractive optical systems and, more particularly, to a compact refractive optical system which provides an extremely wide field of view.

2. Discussion

In certain imaging applications, an extremely wide field of view optical system is required so that a very large two dimensional region of the object space may be covered and searched in a short period of time. Due to the large amount of spatial information to be collected while covering this large field of view, and due to the state of the art in detector array technology, particularly in the infrared portion of the spectrum, it is desirable in such imaging applications to utilize linear detector array technology. The use of a linear detector array dictates the need for some type of scanning technique and device, which allows the linear array to cover a two dimensional field of view. Further, it is desirable that this scanning technique and device be such that the detector assembly which includes the detector array, electronics and cryogenics, to be located on a stationary portion of the optical system. This latter desire is motivated by the difficulties associated with transferring electrical power and signals and cryogenic connections across a dynamic interface.

It is desirable to provide a refractive optical system, which provides search and acquisition capability, that would be useful in a variety of applications. Such applications are full earth surveillance from low altitude space platforms, missile launch warning from an airborne platform, or airborne threat detection from a ground base location.

Prior optical systems which attempt to provide such capabilities typically do not provide the required field of view, are much too large in size and weight, or employ a highly complex and power intensive scanning technique, or often fail to locate the detector array, cryogenics, and electronics off the scanning part of the sensor. Further attempts to fulfil the above applications often make use of optic technology which has not been demonstrated, such as a low loss flexible multi-element fiber optic reformatter.

Thus, there exists a need in the field to provide an optical system which provides a requisite wide field of view, is relatively compact in both size and weight, eliminates complex and power intensive scanning techniques, and which locates the detector array, cryogenics, and electronics off of the scanning part of the sensor.

SUMMARY OF THE INVENTION

According to the teachings of the present invention, a compact refractive optical system is provided which generates an extremely wide field of view. The present invention provides a field of view in excess of 110°. The present invention covers its ultra-wide field of view, approaching a hemisphere, in a short period of time, and enables the use of linear detector technology, with a simple scanning device that enables the detector, cryogenics and electronics to remain fixed. Thus, the detector, cryogenics and electronics are not located on the scanning part of the sensor. The present invention provides these capabilities using proven opto-mechanical sensor technology.

In the preferred embodiment, the refractive optical system is comprised of the following. A first negative power lens doublet receives light from the scene to be viewed. A Pechan prism is positioned to receive and redirect light energy from the first lens doublet. A second positive power lens doublet is positioned to receive light from the Pechan prism. The second lens doublet directs the light energy onto a viewing plane so that the ultra-wide field of view scene may be viewed at the viewing plane. A detector array or the like may be positioned at the viewing plane to receive the light energy.

BRIEF DESCRIPTION OF THE DRAWINGS

The various advantages of the present invention will become apparent to those skilled in the art after a study of the following specification and by reference to the drawings in which.

DETAILED DESCRIPTION OF THE PREFERRED EMBODIMENT

Figure 1:
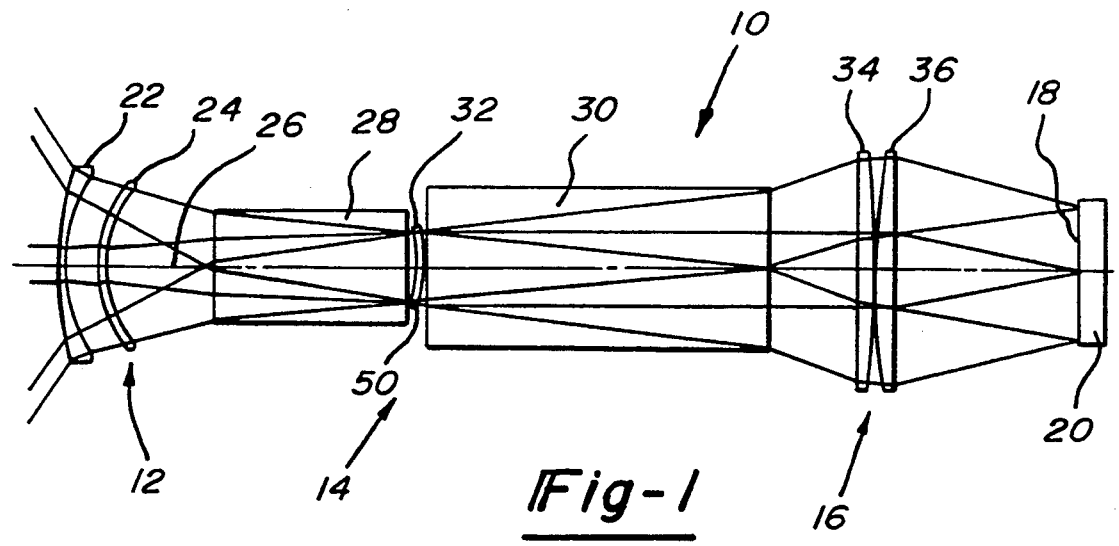
FIG. 1 is a schematic diagram of an unfolded ray trace of the optical system in accordance with the present invention.
Figure 2:
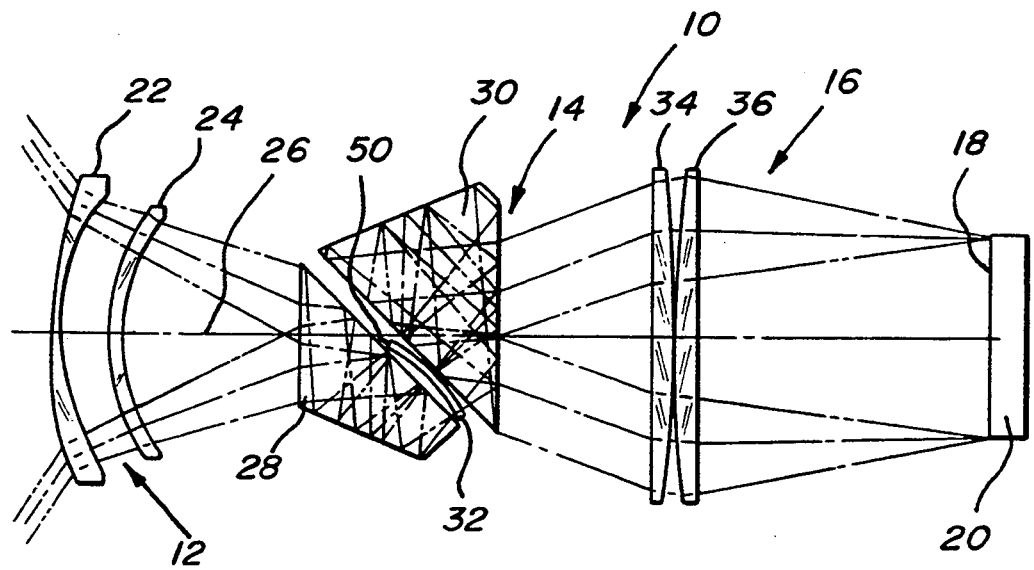
FIG. 2 is a schematic diagram of a folded optical system in accordance with the present invention.

Turning to the figures, a compact refractive optical system is illustrated and designated with the reference numeral 10. The system includes a first lens doublet 12, a prism assembly 14 and a second lens doublet 16. The system provides an ultra wide field of view focusing its image onto a viewing plane 18, which may be viewed by a detector array 20 or the like.

The first lens doublet includes a pair of lenses 22 and 24. Lens 22 defines an optical axis 26 through its vertex. The lens 22 is a negative power convex/concave lens formed from silicon material. Lens 22 has a predetermined radius of curvature on both the front convex and back concave surfaces of the lens. Also, the lens 22 has a predetermined vertex thickness and predetermined fringe power.

The second lens 24 has its vertex centered on the optical axis 26. Generally, the lens 24 is a negative power convex/concave lens formed from silicon material. The lens 24 has a predetermined radius of curvature on the front convex and back concave surfaces of the lens. Also, the lens 24 has a predetermined vertex thickness and predetermined fringe power.

The prism assembly 14 includes Pechan prism halves 28 and 30 and a lens 32. The Pechan prism halves 28 and 30 are conventional Pechan prisms having planar faces angled with respect to one another for directing and redirecting the light rays through the prism halves 28 and 30. The Pechan prism halves 28 and 30 are also made from silicon material.

The lens 32 is positioned at the system aperture stop between the Pechan prism halves 28 and 30. Generally, the lens 32 is a concave/convex positive power lens made from silicon material. The lens 32 has a predetermined radius of curvature on its front concave and back convex surfaces of the lens. Also, the lens 32 has a predetermined vertex thickness and a predetermined fringe power.

The light beam is directed from the Pechan prism half 30 to the second lens doublet 16. The lens doublet 16 includes lenses 34 and 36. Both lenses 34 and 36 are centered on the optical axis 26. Generally, the lenses 34 and 36 are positive power convex lenses formed from germanium material. The lenses 34 and 36 each have a predetermined radius of curvature on both their front and back convex surfaces of the lenses. Also, the lenses 34 and 36 each have a predetermined vertex thickness and predetermined fringe power.

The first lens doublet, prism and second lens doublet are positioned in space with respect to one another such that they form an image of the scene to be viewed on the viewing plane 18. The first lens doublet diverges the beams of light from the scene to the first Pechan prism half 28. The lens 32, positioned at the aperture stop 50, recollimates the beams of light and directs the light into the other Pechan prism half 30. The light beam is then directed through the second positive power doublet 16. Upon passing through the second doublet 16, the light beam is converged or focused on the viewing plane 18.

In describing the scanning operation of the optical system, it is useful to consider the optical system in reverse, that is, from the detector array out to object space. This approach is fully supported by the principle of reversibility of light. Using this approach, the positive power doublet 16 forms a collimated image of the detector array 20. If the detector array 20 is linear, the field of view out of doublet 16 will also be linear. As the Pechan assembly 14 is rotated about the optical axis 26, this linear field of view out of doublet 16 is made to rotate at twice the rate. This rotating field of view is then presented to the negative power doublet 12 for recollimation and projection into object space. In this manner, a linear detector array is rotated and scanned to cover a circular field of view.

A specific prescription for the optical system having an ultra wide field of view, in excess of 110°, is given in the following table:

where:
Z = surface SAG
C = 1/RD
K = CC = Conic Constant = −(Eccentricity)$^2$
$\rho^2 = x^2 + y^2$ Thus, the invention provides search and acquisition capabilities that are useful in a variety of applications. Some of the applications include full earth surveillance from a low altitude space platform, missile launch warning from an airborne platform, or airborne threat detection from a ground base location.

The present invention provides a sensor which may be used in connection with short wave infrared surveillance sensors. The present invention also provides an ultra wide field of view, in excess of 110° providing a compact size and weight and eliminates highly complex and power intensive scanning techniques. Also, the present invention enables the detector array, cryogenics and electronics to be located off the scanning part of the sensor. The present invention also enables operation in the short wave infrared and medium wave infrared spectral ranges. The invention may be used in other wavelength regions where the use of different refractive optical materials is necessary.

It should be understood that while this invention has been described in connection with the particular example hereof, that various modifications, alterations and variations of the present embodiment can be made after having the benefit of the study of the specification, drawings and subjoined claims.

What is claimed is:

1. A refractive optical system comprising:
   first lens means for receiving light from a scene;
   prism means for redirecting said light, said prism means including a singlet lens and being positioned to receive light from said first lens means, said prism means enabling scanning of an ultra wide field of view of said scene;
   second lens means for focusing said light on a viewing plane, said second lens means positioned to receive light from said prism means such that said ultra wide field of view of said scene is focused on a detection plane.

2. The refractive optical system as set forth in claim 1, wherein said "ultra-wide" field of view is greater than 110°.

TABLE 1

| No. | Radius | CC | D | E | F | G | Thickness | Material |
|---|---|---|---|---|---|---|---|---|
| 22 | 10.073 | — | — | — | — | — | 0.300 | Si (n = 3.432) |
|  | 7.279 | 1.4943 | $0.5105 \times 10^{-3}$ | $0.1572 \times 10^{-4}$ | $-0.3165 \times 10^{-6}$ | $0.1470 \times 10^{-6}$ | 1.179 | Air |
| 24 | 4.950 | — | — | — | — | — | 0.300 | Si |
|  | 4.100 | −0.1901 | $-0.1012 \times 10^{-2}$ | $-0.2189 \times 10^{-4}$ | $-0.3447 \times 10^{-5}$ | $0.1220 \times 10^{-6}$ | 3.881 | Air |
| 28 | ∞ | — | — | — | — | — | 7.100 | Si |
|  | ∞ | — | — | — | — | — | 0.300 | Air |
| 32 | −8.210 | 0.6579 | $-0.9613 \times 10^{-4}$ | $0.2127 \times 10^{-6}$ | $-0.2192 \times 10^{-5}$ | $0.9546 \times 10^{-6}$ | 0.300 | Si |
|  | −6.779 | — | — | — | — | — | 0.100 | Air |
| 30 | ∞ | — | — | — | — | — | 12.300 | Si |
|  | ∞ | — | — | — | — | — | 3.192 | Air |
| 34 | −105.943 | — | — | — | — | — | 0.600 | Ge (n = 4.045) |
|  | −30.903 | −3.2082 | $0.1435 \times 10^{-4}$ | $0.6285 \times 10^{-6}$ | $0.1704 \times 10^{-7}$ | $0.4358 \times 10^{-9}$ | 0.050 | Air |
| 36 | 55.127 | 15.955 | $0.1909 \times 10^{-4}$ | $0.3856 \times 10^{-6}$ | $0.1697 \times 10^{-7}$ | $0.1754 \times 10^{-9}$ | 0.600 | Ge |
|  | −114.009 | — | — | — | — | — | 6.778 | Air |
| 18 | ∞ | — | — | — | — | — | — | — |

((+) thicknesses are to the right; (+) radii have centers to the right; (+) decenters are up; (+) tilts are counter-clockwise; decenters done before tilts) surface figure departures according to the equation:

$$Z = \frac{c\rho^2}{\sqrt{1 + 1 - (K+1)c^2\rho^2}} + d\rho^4 + e\rho^6 + f\rho^8 + g\rho^{10}$$

3. The refractive optical system as set forth in claim 1, wherein said first lens means is a negative power lens doublet.

4. The refractive optical system as set forth in claim 1, wherein said second lens means is a positive power lens doublet.

5. A refractive optical system comprising:
 a first lens doublet for receiving light from a scene;
 a Pechan prism assembly for receiving and redirecting said light from said first lens doublet, said Pechan prism assembly including a lens positioned to receive light between halves of said Pechan prism and providing scanning of an ultra wide field of view of said scene to be viewed; and
 a second lens doublet for receiving light from said Pechan prism and focusing said light on a detection plane such that said ultra wide field of view may be detected at said detection plane.

6. The refractive optical system as set forth in claim 5, wherein said first doublet has a negative power.

7. The refractive optical system as set forth in claim 5, wherein said second doublet has a positive power.

8. The refractive optical system as set forth in claim 5, wherein said Pechan prism assembly is rotatable.

9. The refractive optical system as set forth in claim 5, wherein a system aperture stop is located between two Pechan prism halves.

10. A refractive inverse telephoto optical system comprising:
 a first negative power lens doublet for receiving light from a scene;
 a Pechan prism for receiving and redirecting said light from said first lens doublet, said Pechan prism providing scanning of an ultra wide field of view of said scene to be viewed;
 a singlet lens positioned to receive light between halves of said Pechan prism; and
 a second positive power lens doublet for receiving light from said Pechan prism and focusing said light on a detection plane such that said ultra wide field of view may be detected at said detection plane.

11. The refractive inverse telephoto optical system as set forth in claim 10, wherein said Pechan prism assembly is rotatable.

12. The refractive inverse telephoto optical system as set forth in claim 10, wherein a system aperture stop is located between two Pechan prism halves.

13. The refractive inverse telephoto optical system as set forth in claim 10, wherein said lenses of said first doublet are silicon lenses and both have negative power.

14. The refractive inverse telephoto optical system as set forth in claim 10, wherein said Pechan prism is made of silicon.

15. The refractive inverse telephoto optical system as set forth in claim 10, wherein said lenses of said second doublet are germanium lenses and both have positive power.

16. The refractive inverse telephoto optical system as set forth in claim 10, wherein said singlet lens is a silicon positive power lens.

* * * * *